(12) United States Patent
Kamerkar et al.

(10) Patent No.: US 8,576,713 B2
(45) Date of Patent: Nov. 5, 2013

(54) TRAFFIC GENERATOR WITH PRIORITY FLOW CONTROL

(75) Inventors: Sushil S. Kamerkar, Woodland Hills, CA (US); Limin Liu, Simi Valley, CA (US); Anup Jethra, Woodland Hills, CA (US); Gerald Pepper, Thousand Oaks, CA (US)

(73) Assignee: Ixia, Calabasas, CA (US)

( * ) Notice: Subject to any disclaimer, the term of this patent is extended or adjusted under 35 U.S.C. 154(b) by 800 days.

(21) Appl. No.: 12/766,704

(22) Filed: Apr. 23, 2010

(65) Prior Publication Data

US 2011/0261698 A1 Oct. 27, 2011

(51) Int. Cl.
*H04L 12/26* (2006.01)

(52) U.S. Cl.
USPC ........................................ 370/235; 370/395.4

(58) Field of Classification Search
USPC .............. 370/229–235, 236.1, 241–254, 389, 370/394, 473, 508, 517, 395.4; 709/223–225; 379/9–13; 703/13
See application file for complete search history.

(56) References Cited

U.S. PATENT DOCUMENTS

| 6,028,847 | A | 2/2000 | Beanland | |
|---|---|---|---|---|
| 6,950,405 | B2 | 9/2005 | Van Gerrevink | |
| 8,248,945 | B1* | 8/2012 | Sathe et al. | 370/235 |
| 2005/0174941 | A1* | 8/2005 | Shanley et al. | 370/235 |
| 2008/0117810 | A1* | 5/2008 | Stott et al. | 370/230 |
| 2008/0298380 | A1* | 12/2008 | Rittmeyer et al. | 370/412 |
| 2009/0073881 | A1* | 3/2009 | Cui | 370/235 |
| 2012/0066407 | A1* | 3/2012 | Andries et al. | 709/232 |

OTHER PUBLICATIONS

Cisco Systems, Inc., Priority Flow Control: Build Reliable Layer 2 Infrastructure, http://www.cisco.com/en/US/prod/collateral/switches/ps9441/ps9670/white_paper_c11-542809.pdf, 2009, pp. 1-8.

* cited by examiner

*Primary Examiner* — Habte Mered
(74) *Attorney, Agent, or Firm* — SoCal IP Law Group LLP; John E. Gunther; Steven C. Sereboff

(57) ABSTRACT

Port units, methods, and computer readable storage media for testing a network are disclosed. A traffic generator may generate and transmit test traffic over a network under test, the test traffic including a plurality of interleaved packet streams, each traffic stream associated with one of a plurality of flow control groups. A traffic receiver may receive flow control packets from the network under test. The traffic generator may be configured to stop transmission of all packet streams associated with one or more paused flow control groups when the traffic receiver receives a flow control packet identifying the one or more paused flow control groups.

26 Claims, 7 Drawing Sheets

TRAFFIC GENERATOR WITH PRIORITY FLOW CONTROL

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to generating traffic for testing a network or network device.

2. Description of the Related Art

In many types of communications networks, each message to be sent is divided into portions of fixed or variable length. Each portion may be referred to as a packet, a frame, a cell, a datagram, a data unit, or other unit of information, all of which are referred to herein as packets.

Each packet contains a portion of an original message, commonly called the payload of the packet. The payload of a packet may contain data, or may contain voice or video information. The payload of a packet may also contain network management and control information. In addition, each packet contains identification and routing information, commonly called a packet header. The packets are sent individually over the network through multiple switches or nodes. The packets are reassembled into the message at a final destination using the information contained in the packet headers, before the message is delivered to a target device or end user. At the receiving end, the reassembled message is passed to the end user in a format compatible with the user's equipment.

Communications networks that transmit messages as packets are called packet switched networks. Packet switched networks commonly contain a mesh of transmission paths which intersect at hubs or nodes. At least some of the nodes may include a switching device or router that receives packets arriving at the node and retransmits the packets along appropriate outgoing paths. Packet switched networks are governed by a layered structure of industry-standard protocols. Layers 1, 2, and 3 of the structure are the physical layer, the data link layer, and the network layer, respectively.

Layer 1 protocols define the physical (electrical, optical, or wireless) interface between nodes of the network. Layer 1 protocols include various Ethernet physical configurations, the Synchronous Optical Network (SONET) and other optical connection protocols, and various wireless protocols such as WiFi.

Layer 2 protocols govern how data is logically transferred between nodes of the network. Layer 2 protocols include the Ethernet, Asynchronous Transfer Mode (ATM), Frame Relay, and Point to Point Protocol (PPP).

Layer 3 protocols govern how packets are routed from a source to a destination along paths connecting multiple nodes of the network. The dominant layer 3 protocols are the well-known Internet Protocol version 4 (IPv4) and version 6 (IPv6). A packet switched network may need to route IP packets using a mixture of the Ethernet, ATM, FR, and/or PPP layer 2 protocols. At least some of the nodes of the network may include a router that extracts a destination address from a network layer header contained within each packet. The router then used the destination address to determine the route or path along which the packet should be retransmitted. A typical packet may pass through a plurality of routers, each of which repeats the actions of extracting the destination address and determining the route or path along which the packet should be retransmitted.

In order to test a packet switched network or a device included in a packet switched communications network, test traffic comprising a large number of packets may be generated, transmitted into the network at one or more ports, and received at different ports. Each packet in the test traffic may be a unicast packet intended for reception at a specific destination port or a multicast packet, which may be intended for reception at two or more destination ports. In this context, the term "port" refers to a communications connection between the network and the equipment used to test the network. The term "port unit" refers to a module within the network test equipment that connects to the network at a port. The received test traffic may be analyzed to measure the performance of the network. Each port unit connected to the network may be both a source of test traffic and a destination for test traffic. Each port unit may emulate a plurality of logical source or destination addresses. The number of port units and the communications paths that connect the port units to the network are typically fixed for the duration of a test session. The internal structure of the network may change during a test session, for example due to failure of a communications path or hardware device.

A series of packets originating from a single port unit and having a specific type of packet and a specific rate will be referred to herein as a "stream." A source port unit may support multiple outgoing streams simultaneously and concurrently, for example to accommodate multiple packet types, rates, or destinations. "Simultaneously" means "at exactly the same time." "Concurrently" means "within the same time."

For the purpose of collecting test data, the test traffic may be organized into packet groups, where a "packet group" is any plurality of packets for which network traffic statistics are accumulated. The packets in a given packet group may be distinguished by a packet group identifier (PGID) contained in each packet. The PGID may be, for example, a dedicated identifier field or combination of two or more fields within each packet.

For the purpose of reporting network traffic data, the test traffic may be organized into flows, where a "flow" is any plurality of packets for which network traffic statistics are reported. Each flow may consist of a single packet group or a small plurality of packet groups. Each packet group may typically belong to a single flow.

Within this description, the term "engine" means a collection of hardware, which may be augmented by firmware and/or software, which performs the described functions. An engine may typically be designed using a hardware description language (HDL) that defines the engine primarily in functional terms. The HDL design may be verified using an HDL simulation tool. The verified HDL design may then be converted into a gate netlist or other physical description of the engine in a process commonly termed "synthesis". The synthesis may be performed automatically using a synthesis tool. The gate netlist or other physical description may be further converted into programming code for implementing the engine in a programmable semiconductor device such as a field programmable gate array (FPGA), a programmable logic device (PLD), or a programmable logic arrays (PLA). The gate netlist or other physical description may be converted into process instructions and masks for fabricating the engine within an application specific integrated circuit (ASIC).

Within this description, the term "logic" also means a collection of hardware that performs a described function, which may be on a smaller scale than an "engine". "Logic" encompasses combinatorial logic circuits; sequential logic circuits which may include flip-flops, registers and other data storage elements; and complex sequential logic circuits such as finite-state machines.

Within this description, a "unit" also means a collection of hardware, which may be augmented by firmware and/or software, which may be on a larger scale than an "engine". For example, a unit may contain multiple engines, some of which may perform similar functions in parallel. The terms "logic", "engine", and "unit" do not imply any physical separation or demarcation. All or portions of one or more units and/or engines may be collocated on a common card, such as a network card, or within a common FPGA, ASIC, or other circuit device.

Throughout this description, elements appearing in block diagrams are assigned three-digit reference designators, where the most significant digit is the figure number and the two least significant digits are specific to the element. An element that is not described in conjunction with a block diagram may be presumed to have the same characteristics and function as a previously-described element having a reference designator with the same least significant digits.

In block diagrams, arrow-terminated lines may indicate data paths rather than signals. Each data path may be multiple bits in width. For example, each data path may consist of 4, 8, 16, 64, 256, or more parallel connections.

DETAILED DESCRIPTION

Description of Apparatus

Figure 1:
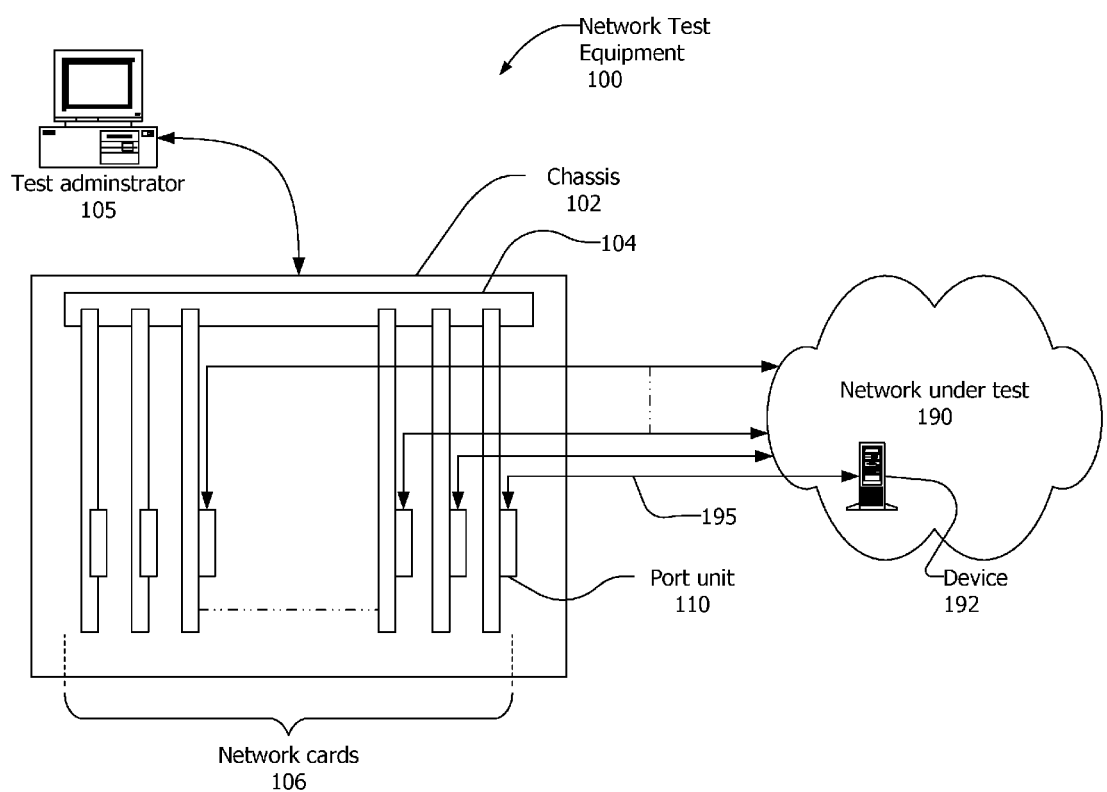
FIG. 1 is a block diagram of a network environment.

FIG. 1 shows a block diagram of a network environment. The environment may include network test equipment 100, a network 190 and plural network devices 192.

The network test equipment 100 may be a network testing device, performance analyzer, conformance validation system, network analyzer, or network management system. The network test equipment 100 may include one or more network cards 106 and a backplane 104 contained or enclosed within a chassis 102. The chassis 102 may be a fixed or portable chassis, cabinet, or enclosure suitable to contain the network test equipment. The network test equipment 100 may be an integrated unit, as shown in FIG. 1. Alternatively, the network test equipment 100 may comprise a number of separate units cooperative to provide traffic generation and/or analysis. The network test equipment 100 and the network cards 106 may support one or more well known standards or protocols such as the various Ethernet and Fibre Channel standards, and may support proprietary protocols as well.

The network cards 106 may include one or more field programmable gate arrays (FPGAs), application specific integrated circuits (ASICs), programmable logic devices (PLDs), programmable logic arrays (PLAs), processors and other kinds of devices. In addition, the network cards 106 may include software and/or firmware. The term network card encompasses line cards, test cards, analysis cards, network line cards, load modules, interface cards, network interface cards, data interface cards, packet engine cards, service cards, smart cards, switch cards, relay access cards, and the like. The term network card also encompasses modules, units, and assemblies that may include multiple printed circuit boards. Each network card 106 may contain one or more port unit 110. Each port unit 110 may connect to the network 190 through one or more ports. Each port unit 110 may be connected to the network 190 through a communication medium 195, which may be a wire, an optical fiber, a wireless link, or other communication medium. Each network card 106 may support a single communications protocol, may support a number of related protocols, or may support a number of unrelated protocols. The network cards 106 may be permanently installed in the network test equipment 100 or may be removable.

The backplane 104 may serve as a bus or communications medium for the network cards 106. The backplane 104 may also provide power to the network cards 106.

The network devices 192 may be any devices capable of communicating over the network 190. The network devices 192 may be computing devices such as workstations, personal computers, servers, portable computers, personal digital assistants (PDAs), computing tablets, cellular/mobile telephones, e-mail appliances, and the like; peripheral devices such as printers, scanners, facsimile machines and the like; network capable storage devices including disk drives such as network attached storage (NAS) and storage area network (SAN) devices; networking devices such as routers, relays, hubs, switches, bridges, and multiplexers. In addition, the network devices 192 may include appliances, alarm systems, and any other device or system capable of communicating over a network.

The network 190 may be a Local Area Network (LAN), a Wide Area Network (WAN), a Storage Area Network (SAN), wired, wireless, or a combination of these, and may include or be the Internet. Communications on the network 190 may take various forms, including frames, cells, datagrams, packets or other units of information, all of which are referred to herein as packets. The network test equipment 100 and the network devices 192 may communicate simultaneously with one another, and there may be plural logical communications paths between the network test equipment 100 and a given network device 195. The network itself may be comprised of numerous nodes providing numerous physical and logical paths for data to travel.

Each port unit 110 may be connected, via a specific communication link 195, to a corresponding port on a network device 192. In some circumstances, the port unit 110 may send more traffic to the corresponding port on the network device 192 than the network device 192 can properly receive. For example, the network device 192 may receive incoming packets from a plurality of sources at a total rate that is faster than the rate at which the network device 192 can process and forward the packets. In this case, buffer memories within the network device 192 may fill with received but unprocessed packets. To avoid losing packets due to buffer memory overflow, the network device 192 may send a flow control message or packet to the port unit 110.

For example, if the port unit 110 and the network device 192 communicate using a full-duplex Ethernet connection, IEEE Standard 802.3x provides that the network device 192 may send a pause frame or packet to the port unit 110. The pause frame may instruct the port unit 110 to stop sending packets, except for certain control packets, for a time period defined by data within the pause packet. The network device 192 may also send a pause packet defining a time period of zero to cause a previously-paused port unit to resume transmitting packets.

However, simply pausing the output from a port unit may not be an acceptable method of flow control in networks that prioritize traffic in accordance with quality of service (QoS) levels, traffic classes, or some other priority scheme. For example, IEEE Standard 802.1Qbb provides that a receiver may control the flow of eight traffic classes. To affect flow control, the receiver may send a priority flow control (PFC) packet to the transmitter instructing that any or all of eight traffic classes be paused. The PFC packet may also independently define the period for which each traffic class should be paused.

Figure 2:
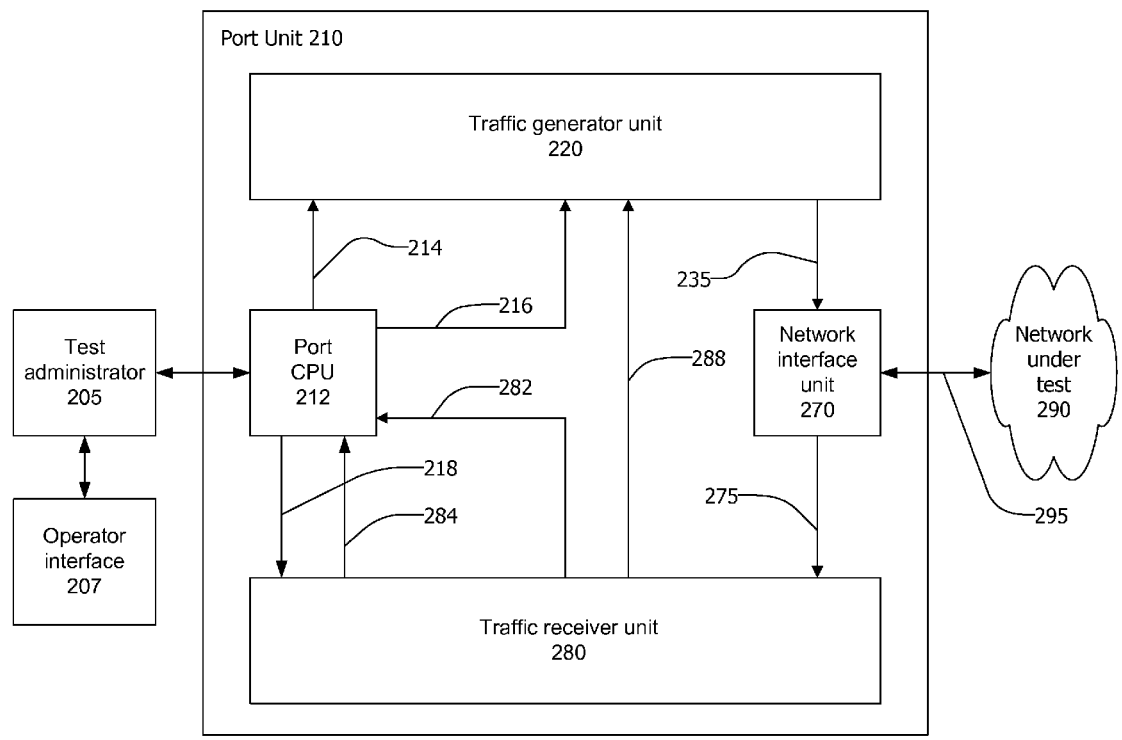
FIG. 2 is a block diagram of a port unit.

Referring now to FIG. 2, an exemplary port unit 210 may include a port processor 212, a traffic generator unit 220, a traffic receiver unit 280, and a network interface unit 270 which couples the port unit 210 to a network under test 290. The port unit 210 may be all or part of a network card such as the network cards 106.

The port processor 212 may include a processor, a memory coupled to the processor, and various specialized units, circuits, software and interfaces for providing the functionality and features described here. The processes, functionality and features may be embodied in whole or in part in software which operates on the processor and may be in the form of firmware, an application program, an applet (e.g., a Java applet), a browser plug-in, a COM object, a dynamic linked library (DLL), a script, one or more subroutines, or an operating system component or service. The hardware and software and their functions may be distributed such that some functions are performed by the processor and others by other devices.

The port processor 212 may communicate with a test administrator 205. The test administrator 205 may be a computing device contained within, or external to, the network test equipment 100. The test administrator 205 may provide the port processor 212 with instructions and data required for the port unit to participate in testing the network 290. The instructions and data received from the test administrator 205 may include, for example, definitions of packet streams to be generated by the port unit 210 and definitions of performance statistics that may be accumulated and reported by the port unit 210.

The port processor 212 may provide the traffic generator unit 220 with stream forming data 214 to form a plurality of streams. The stream forming data 214 may include, for example, the type of packet, the frequency of transmission, definitions of fixed and variable-content fields within the packet and other information for each packet stream. The traffic generator unit 220 may then generate the plurality of streams in accordance with the stream forming data 214. The plurality of streams may be interleaved to form outgoing test traffic 235. Each of the streams may include a sequence of packets. The packets within each stream may be of the same general type but may vary in length and content.

The network interface unit 270 may convert the outgoing test traffic 235 from the traffic generator unit 220 into the electrical, optical, or wireless signal format required to transmit the test traffic to the network under test 290 via a link 295, which may be a wire, an optical fiber, a wireless link, or other communication link. Similarly, the network interface unit 270 may receive electrical, optical, or wireless signals from the network over the link 295 and may convert the received signals into incoming test traffic 275 in a format usable to the traffic receiver unit 280.

The traffic receiver unit 280 may receive the incoming test traffic 275 from the network interface unit 270. The traffic receiver unit 280 may determine if each received packet is a member of a specific flow, and may accumulate test statistics for each flow in accordance with test instructions 218 provided by the port processor 212. The accumulated test statistics may include, for example, a total number of received packets, a number of packets received out-of-sequence, a number of received packets with errors, a maximum, average, and minimum propagation delay, and other statistics for each flow. The traffic receiver unit 280 may also capture and store specific packets in accordance with capture criteria included in the test instructions 218. The traffic receiver unit 280 may provide test statistics and/or captured packets 284 to the port processor 212, in accordance with the test instructions 218, for additional analysis during, or subsequent to, the test session.

The outgoing test traffic 235 and the incoming test traffic 275 may be primarily stateless, which is to say that the outgoing test traffic 235 may be generated without expectation of any response and the incoming test traffic 275 may be received without any intention of responding. However, some amount of stateful, or interactive, communications may be required or desired between the port unit 210 and the network 290 during a test session. For example, the traffic receiver unit 280 may receive control packets, which are packets containing data necessary to control the test session, that require the port unit 210 to send an acknowledgement or response.

The traffic receiver unit 280 may separate incoming control packets from the incoming test traffic and may route the incoming control packets 282 to the port processor 212. The port processor 212 may extract the content of each control packet and may generate an appropriate response in the form of one or more outgoing control packets 216. Outgoing control packets 216 may be provided to the traffic generator unit 220. The traffic generator unit 220 may insert the outgoing control packets 216 into the outgoing test traffic 235.

The outgoing test traffic 235 from the traffic generator unit 220 may be divided into "flow control groups" which may be independently paused. Each stream generated by the traffic generator unit 220 may be assigned to a flow control group, and each flow control group may include none, one, or a plurality of streams. One form of control packet that may be received by the port unit 220 may be flow control packets 288, which may be, for example, in accordance with IEEE 802.3x or IEEE 802.1Qbb. Flow control packets 288 may be recognized within the traffic receiver unit 280 and may be provided directly from the traffic receiver unit 280 to the traffic generator unit 220.

The following description includes examples that assume flow control between a network test equipment port unit and a network device is managed using flow control packets according to IEEE 802.1Qbb. However, the described apparatus and methods are compatible with other present or future prioritized flow control schemes, including more or fewer than eight traffic classes.

Figure 3:
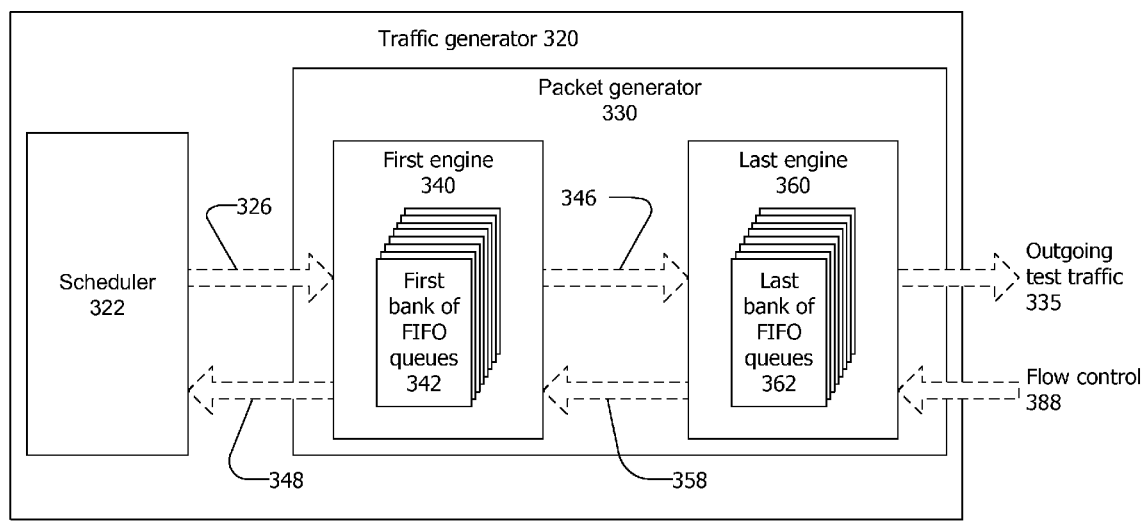
FIG. 3 is a block diagram of a traffic generator.

Referring now to FIG. 3, an exemplary traffic generator 320 may generate outgoing test traffic 325 composed of a plurality of interleaved streams of packets. The traffic generator may be capable of generating, for example, 16 streams, 64 streams, 256 streams, 512 streams, or some other number streams which may be interleaved in any combination to provide the test traffic. The exemplary traffic generator 320 may be the traffic generator unit 220 of FIG. 2 and may be all or a portion of a network card 106 as shown in FIG. 1.

The traffic generator 320 may include a scheduler 322 and a packet generator 330. The scheduler 322 may determine a sequence in which packets should be generated based upon stream forming data for a plurality of streams. For example, the scheduler 322 may schedule a plurality of streams. A desired transmission rate may be associated with each stream. The scheduler 322 may include a timing mechanism for each stream to indicate when each stream should contribute a packet to the test traffic. The scheduler 322 may also include arbitration logic to determine the packet sequence in situations when two or more stream should contribute packets at the same time. The scheduler 322 may be implemented in hardware or a combination of hardware and software. For example, U.S. Pat. No. 7,616,568 B2 describes a scheduler using linked data structures and a single hardware timer. Pending application Ser. No. 12/496,415 describes a scheduler using a plurality of hardware timers.

For each packet to be generated, the scheduler 322 may provide the packet generator 330 with first packet forming data 326. In this patent, the term "packet forming data" means any data necessary to generate a packet. Packet forming data may include data identifying a type, length, or other characteristic of a packet to be formed. Packet forming data may include fragments, fields, or portion of packets, and incompletely formed packets. Completed, transmission-ready, packets are not considered to be packet forming data. The first packet forming data 326 provided by the scheduler 322 to the packet generator 330 may include data identifying one stream of the plurality of streams. To allow priority flow control, the first packet forming data 326 may also include data identifying a flow control group associated with the identified stream. The first packet forming data 326 may include other data necessary to form each packet.

The actions required by the packet generator 330 to generate a packet may include defining a packet format, which may be common to all packets in a stream, and determining a packet length. The packet generator 330 may generate content for a payload portion of each packet. The packet generator 330 may generate other content specific to each packet, which may include, for example, source and destination addresses, sequence numbers, port numbers, and other fields having content that varies between packets in a stream. The packet generator 330 may also calculate various checksums and a frame check sequence, and may add a timestamp to each packet. The time required to generate a packet may be longer than the time required for transmission of the packet. To allow continuous transmission of test traffic, multiple packets may have to be generated simultaneously. Thus the packet generator 330 may be organized as a pipeline including two or more processing engines that perform sequential stages of a packet generation process. At any given instant, each processing engine may be processing different packets, thus providing a capability to generate a plurality of packets simultaneously.

The packet generator 330 may include a first processing engine 340 and a last processing engine 360 and, optionally, one or more intermediate processing engines which are not shown in FIG. 3. The first processing engine 340 may input first packet forming data 326 from the scheduler 322 and may output intermediate packet forming data 346. The intermediate packet forming data may flow through and be modified by intermediate processing engines, if present. Each intermediate processing engine may receive packet forming data from a previous processing engine in the pipeline and output modified packet forming data to a subsequent processing engine in the pipeline. The packet forming data may be modified and expanded at each processing engine in the pipeline. The last processing engine 360 may receive intermediate packet forming data 346 from a previous processing engine and may output a sequence of completed packets as test traffic 335.

The time required for the first processing engine 340, the last processing engine 360, and any intermediate processing engines (not shown) to process a specific packet may depend on characteristics of the specific packet, such as the number of variable-content fields to be filled, the length of the payload to be filled, and the number and scope of checksums to be calculated. The time required to process a specific packet may be different for each processing engine. At any given processing engine, the time required to process a specific packet may not be the same as the time required to process the previous or subsequent packets.

A pipeline packet generator may include first-in first-out (FIFO) buffer memories or queues to regulate the flow of packet forming data between or within stages of the pipeline. In the example of FIG. 3, the first processing engine includes a first bank of FIFO queues 342 and the last processing engine 360 includes a last bank of FIFO queues 362. Any intermediate processing engines (not shown) may also include banks of FIFO queues. The banks of FIFO queues 342, 362 may not store completed packets, but may be adapted to store packet forming data appropriate for the respective stage of the packet forming process.

To allow priority flow control of the outgoing test traffic 325, at least some of the banks of FIFO queues with a pipeline packet generator may include parallel FIFO queues corresponding to a plurality of flow control groups. In the example of FIG. 3, each of the banks of FIFO queues 342, 362 may include 8 parallel FIFO queues corresponding to eight flow control groups as required, for example, by IEEE Standard 802.1Qbb. Providing separate FIFO queues for each flow control group may allow packets for flow control groups that are not paused to pass packets from paused flow control groups within the pipeline packet processor 330.

The packet generator 330 may receive flow control data 388, which may be based on flow control packets received from a network under test. The flow control data may be or include a plurality of bits indicating whether or not respective groups of the plurality of flow control groups are paused. When the packet generator 330 receives flow control data indicating that one or more flow control groups should be paused, the packet generator 330 may stop outputting packet streams associated with the one or more paused flow control groups. If the flow control data 388 changes while a packet is being output from the packet generator 330, the transmission of the packet may be completed before the associated flow control group is paused.

Flow control data may propagate through the packet generator 330 in the reverse direction to the flow of packet forming data. The last processing engine 360 may receive flow control data 388 and provide intermediate flow control data 358 to a previous engine in the packet generator 330. The intermediate flow control data 358 may not directly indicate if specific flow control groups are paused, but may indicate if specific FIFO queues in the last bank of FIFO queues 362 are considered full. A FIFO queue considered full may not be completely filled, but may be unable to accept additional packet forming data from the previous processing engine. For example, a FIFO queue may be considered full if the amount of data stored in the queue exceeds a predetermined portion of its capacity. For further example, a FIFO queue may be considered full if the unused capacity of the FIFO queue is insufficient to store a maximum amount of packet forming data that may be associated with a single packet.

The first processing engine 340 and the intermediate processing engines, if present, may continue processing packets for each flow control group until they receive intermediate flow control data 358 indicating that one or more FIFO queues in the subsequent processing engine are considered full. The first processing engine 340 and the intermediate processing engines may stop processing packet streams associated with one or more specific flow control groups if the corresponding FIFO queues in the subsequent processing engine are unable to accept additional packet forming data.

The first process engine 340 may provide scheduler flow control data 348 to the scheduler 322. The scheduler flow control data 348 may indicate that one or more FIFO queues in the first bank of FIFO queues 342 are considered full. The scheduler 322 may stop scheduling packet streams associated with one or more specific flow control groups if the scheduler flow control data 348 indicates that corresponding FIFO queues in the first processing engine 340 are unable to accept additional packet forming data.

Propagating flow control data through the packet generator 330 as described may ensure that, when a previously-paused flow control group is reactivated, transmission of packet streams associated with the previously-paused flow control group can be resumed immediately, without waiting for the pipeline to refill. Additionally, propagating flow control data through the packet generator 330 as described may allow the transmission of packet streams associated with a flow control group to be paused and subsequently resumed without skipping or dropping any packets within the pipeline packet generator.

Figure 4:
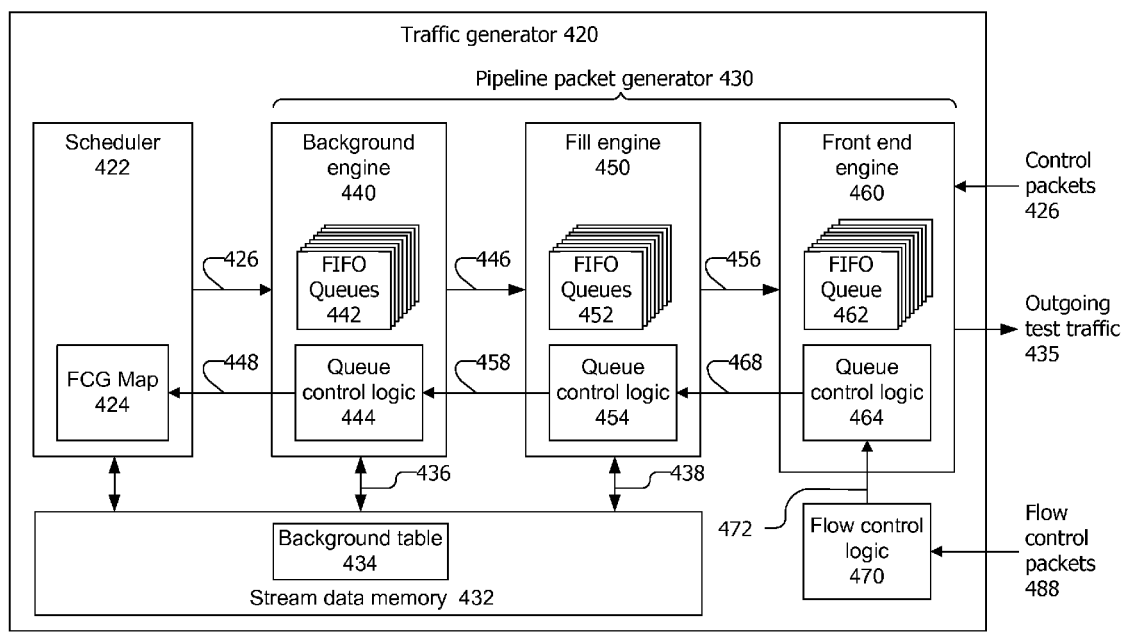
FIG. 4 is a block diagram of a traffic generator.

Referring now to FIG. 4, an exemplary traffic generator 420 may generate outgoing test traffic 425 composed of a plurality of interleaved streams of packets. The traffic generator 420 may be the traffic generator unit 320 of FIG. 3 and may be all or a portion of a network card 106 as shown in FIG. 1. The traffic generator 420 may include a scheduler 422, a pipeline packet generator 430, a stream data memory 432, and flow control logic 470. In this example, the pipeline packet generator 430 includes a background engine 440, a fill engine 450, and a front end engine 460. A pipeline packet generator may include fewer or more than three sequential processing engines.

The stream data memory 432 may store stream forming data received from a port processor such as the port processor 212 or from another computer (not shown) which may direct and monitor network tests. The stream data memory 432 may store stream forming data defining a plurality of streams that constitute a testing session. The stream data memory 432 may store a background table 434 containing one or more background templates for each stream. Each background template may define the general structure of each packet in the corresponding stream and contain the fixed content of each packet. When the background table includes a plurality of background templates for a given stream, the templates may be used in sequence. The stream data memory 432 may also include, for each stream, data defining variable-content fields within each packet, data or instructions for setting the length of each packet, and data or instructions for filling the payload of each packet. Variable-content fields within each packet may include user defined fields (UDFs) defined by UDF definition data, and checksum fields defined by checksum definition data. The stream data memory 432 may also include, for each stream, timing information required for the scheduler 422 to schedule the packets comprising each stream at the appropriate time intervals. The stream data memory 432 may also include other data and instructions.

The stream data memory 432 may be dynamic random access memory (DRAM) and/or static random access memory (SRAM). The stream data memory 432 may be implemented within an ASIC, FPGA or other circuit device containing all or portions of the traffic generator 420. The stream data memory 432 may be implemented wholly or partially with DRAM and/or SRAM memory chips external to the ASIC, FPGA or other device.

The scheduler 422 may determine a sequence in which a plurality of packets, selected from a plurality of streams, should be generated to make up a desired flow of outgoing test traffic 425. The structure and operation of the scheduler 422 may be similar to the structure and operation of scheduler 322.

When the scheduler 422 determines that a packet should be generated for a specific stream, the scheduler may reference a flow control group (FCG) map memory 424 to determine what FCG is associated with the specific stream. The FCG map memory 424 may contain FCG map data associating each stream with one and only one FCG. The FCG map memory 424 may be a portion of the scheduler 422, as shown in FIG. 4, or may be a portion of the stream data memory 432. The FCG map data may be stored in the FCG map memory 424 by a processor, such as the port processor 212. All or portions of the stored FCG map data may be changed during a test session to dynamically reassign one or more streams to different FCGs. The scheduler may send first packet forming data 426 identifying the stream and the FCG of each scheduled packet to the pipeline packet generator 430. The first packet forming data 426 may include other information needed to generate each scheduled packet.

The background engine 440 may retrieve the appropriate background template 436 from the background table 434. The background engine 440 may expand or truncate the payload portion of the background template 436 to achieve an overall packet length determined by the scheduler 422 or the background engine 440. The background engine 440 may send second packet forming data 446 to the fill engine 450. The second packet forming data 446 may include, for example, data identifying the stream and the FCG of each packet and the complete background template for each packet.

The fill engine 450 may then fill or overlay variable-content field data onto the packet template received from the background engine 440 based on variable-content field definition data 438 retrieved from the stream data memory 432. The fill engine 450 may fill the payload portion of the packets. The fill engine may also fill UDFs based on UDF definition data included in the variable-content field definition data 438. Each UDF may be defined by a position, such as, for example, an offset from the start of the packet. Each UDF may be further defined by a type and additional data required to generate the content of the UDF in the packet being generated. For example, one type of UDF may be a counter field defined by an initial value, an increment value, and a maximum value. For further example, another type of UDF may be a table field that is filled with a value selected from a table of values that are used in rotation. Another type of UDF may be a pointer UDF which includes a pointer that may be used to generate an address to retrieve a value from a memory.

After the fill engine 450 has inserted the content of the payload and the content of the user defined fields into the background template, the fill engine may provide third packet forming data 456 to the front end engine 460. The third packet forming data 456 may include, for example, data identifying the stream and the FCG of each packet and the filled background template for each packet.

The front end engine 460 may complete each packet by, for example, calculating one or more checksums and inserting the checksums into appropriate fields in the header of each packet. The front end engine 460 may also calculate a cyclic redundancy check (CRC) value for each packet and insert the CRC value at the end of each packet. The front end engine 460 may also add a timestamp to each packet. Packets may be transmitted in the order completed by the front end engine 460 as outgoing test traffic 435. The front end engine 460 may receive control packets 426 and may transmit the control packets interleaved with packets generated by the pipeline packet generator.

The processing engines 440, 450, 460 may include respective banks of FIFO queues 442, 452, 462 to store packet forming data. For example, each bank of FIFO queues 442, 452, 462 may store packet forming data received from the previous processing engine in the pipeline packet generator 430. The background engine 440 may include a first bank of FIFO queues 442 to temporarily store first packet forming data 426 received from the scheduler 422. The fill engine 450 may include a second bank of FIFO queues 452 to temporarily store second packet forming data 446 received from the background engine 440. The front end engine may 460 include a third bank of FIFO queues 462 to temporarily store third packet forming data 456 received from the fill engine 450. The third bank of % % Other configurations may be used for the pipeline packet generator 430. For example, the FIFO queues may store other data such as intermediate results within the respective processing engine instead of, or in addition to, received packet forming data.

Each bank of FIFO queues 442, 452, 462 may include a plurality of parallel FIFO queues corresponding to a plurality of flow control groups. For example, each bank of FIFO queues 442, 452, 462 may include 8 parallel FIFO queues corresponding to eight flow control groups as required by IEEE Standard 802.1Qbb.

The processing engines 440, 450, 460 may include respective queue control logic 444, 454, 464 to control writing packet forming data to, and reading packet forming data from, the respective banks of FIFO queues 442, 452, 462. Each queue control logic 444, 454, 464 may include a read pointer and a write pointer for each FIFO queue in the respective bank of FIFO queues 442, 452, 462. Each queue control logic 444, 454, 464 may include an arbiter to determine which FIFO queue to read when two or more of the respective FIFO queues contain packet forming data. The arbiter may read packet forming data from non-empty queues in round-robin fashion, or may read data from non-empty queues in accordance with predetermined priorities, or may read data from non-empty queues with accordance with the amount of data held in each queue. The arbiter may use some other method of determining which queue to read.

Each queue control logic 444, 454, 464 may receive flow control data from a subsequent stage of the traffic generator 420 and may provide flow control data to a previous stage of the traffic generator 420. For example the queue control logic 464 within the front end engine 460 may receive first flow control data 472 from the flow control logic 470, which may generate the first flow control data 472 based on received flow control packets 488. The structure and operation of exemplary flow control logic will be described subsequently in conjunction with FIG. 5. The queue control logic 464 may send second flow control data 468 to the queue control logic 454 within the fill engine 450. The queue control logic 454 may send third flow control data 458 to the queue control logic 444 within the background engine 440. The queue control logic 444 may send scheduler flow control data 448 to the scheduler 422.

When the queue control logic 464 receives first flow control data 472 indicating that one or more flow control groups should be paused, the queue control logic 464 may discontinue reading packet forming data from the FIFO queues 462 corresponding to the paused flow control groups. When a flow control group is paused, the queue control logic 464 may continue to store packet forming data in the corresponding FIFO queue until that FIFO queue is considered full. When the corresponding FIFO queue is considered full, the queue control logic 464 may send second flow control data 468 to the queue control logic 454 within the fill engine 450 to indicate which of the FIFO queues 462 are considered full and thus not accepting additional packet forming data.

When a FIFO queue in the front end engine 460 is considered full, the fill engine 450 may stop reading and processing packet forming data for the associated flow control group, but may continue receiving and storing flow control data for the associated flow control group until the corresponding FIFO queue within the fill engine 450 is considered full. The fill engine queue control logic may then send third flow control data 458 to the background engine 440 to indicate which of the FIFO queues 452 are considered full and thus not accepting additional packet forming data.

Similarly, when a FIFO queue in the fill engine 450 is considered full, the background engine 440 may stop reading and processing packet forming data for the associated flow control group, but may continue receiving and storing flow control data for the associated flow control group until the corresponding FIFO queue within the background engine 440 is considered full. When a FIFO queue in the background engine 440 is considered full, the background engine flow control logic 444 may send scheduler flow control data 448 to the scheduler to indicate which of the FIFO queues 442 are considered full and thus not accepting additional packet forming data. The scheduler 422 may discontinue scheduling packet streams associated with the flow control groups corresponding to the full FIFO queues 442.

The scheduler 422, background engine 440, the fill engine 450, and the front end engine 460 may include one or more of: logic arrays, memories, analog circuits, digital circuits, software, firmware, and processors such as microprocessors, field programmable gate arrays (FPGAs), application specific integrated circuits (ASICs), programmable logic devices (PLDs) and programmable logic arrays (PLAs). The physical partitioning of the components of the traffic generator 420 may be different from the functional partitioning shown in FIG. 4, such that a given functional component or block may be divided between two or more circuit devices and a single circuit device may contain all or portions of two or more functional components or all functional components.

Figure 5:
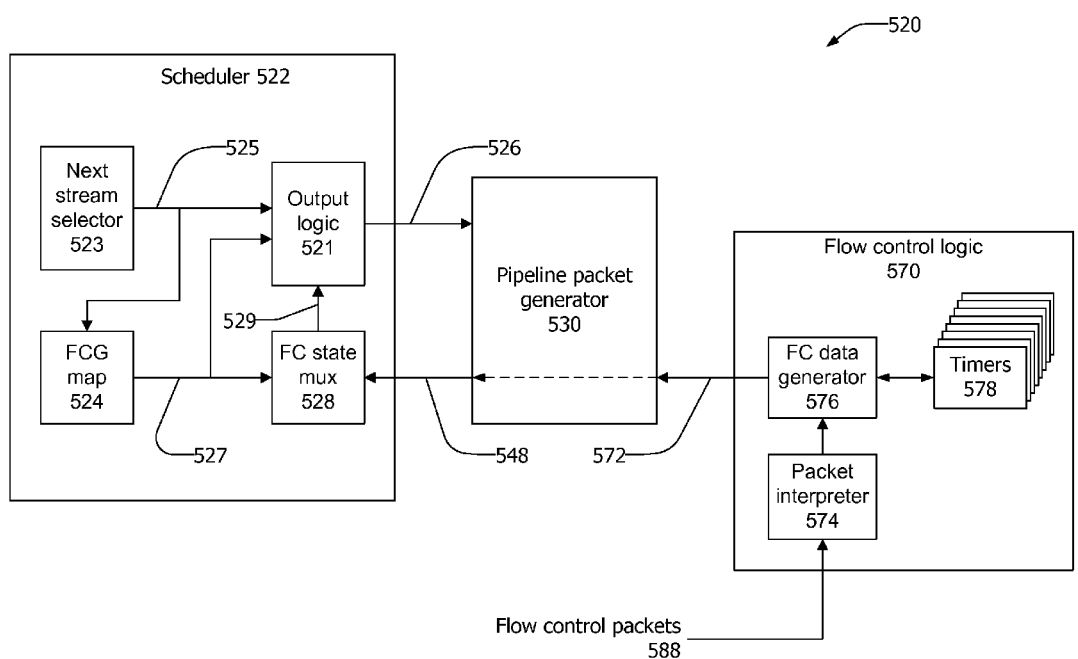
FIG. 5 is a block diagram of a traffic generator showing flow control logic.

Referring now to FIG. 5, a traffic generator 520, which may be the traffic generator 420, may include a scheduler 522, a pipeline packet generator 530, and flow control logic 570. The flow control logic 570 may include a packet interpreter 574, a flow control data generator 576, and a bank of timers 578. The packet interpreter 574 may receive flow control packets 588 from a traffic receiver (not shown) and may extract instructions from each packet. The extracted instructions may include, for example, a mask or other data indicating which flow control groups of a plurality of flow control groups should be paused or resumed. The extracted instructions may further include, for each flow control group to be paused, a pause time interval.

The bank of timers 578 may include a plurality of timers corresponding to the plurality of flow control groups. When a received flow control packet contains instructions indicating that transmission of packets for a flow control group should be paused for a specified time interval, the respective timer may be used to resume transmission of the flow control group when the specified time interval has elapsed. For example, the timer may be set to the specified time interval when the flow control packet is received and may count down to zero, at which time the transmission of the flow control group may be automatically resumed.

The flow control data generator 576 may combine instructions extracted by the packet interpreter 574 and the values of the plurality of counters 578 to provide first flow control data 572 to the pipeline packet generator 530. For example, the flow control data generator 576 may be a finite state machine that maintains a state (paused or not paused) for each of the plurality of flow control groups. The first flow control data 572 may be a plurality of bits corresponding to the plurality of flow control groups, with each bit indicating the paused/not paused state of the respective flow control group.

Flow control data may propagate through the pipeline packet generator 530 as previously described. When FIFO queues (not shown) within the pipeline packet generator 530 are considered full for one or more flow control groups, the pipeline packet generator 530 may provide scheduler flow control data 548 to the scheduler 522. The scheduler flow control data 548 may be, for example, a plurality of bits corresponding to the plurality of flow control groups, with each bit indicating whether or not the schedule 522 should suspend scheduling packets streams associated with the respective flow control group.

The scheduler 522 may use a variety of architectures and techniques for scheduling packets. For example, the scheduler 522 may include a next stream selector 523, a flow control group (FCG) map memory 524, a flow control state multiplexer 528, and output logic 512. The next stream selector 523 may perform the basic scheduling function of identifying next streams, from a plurality of streams, where the "next stream" is the stream scheduled to contribute the next packet to a flow of outgoing test traffic. The next stream may be identified by a next stream identifier 525. For example, if the traffic generator 520 is configured to generate up to 256 interleaved streams, the next stream identifier may be an 8-bit number identifier a specific one of the 256 streams.

Each stream of the plurality of streams may be associated with a flow control group. The associations between streams and flow control groups may be defined by data contained in the flow control group map memory 524. The next stream identifier 525 may be used to access the flow control group map memory 524 to extract a flow control group identifier 527 that identifies a flow control group associated with the next stream. For example, if the traffic generator 520 is configured for eight flow control groups, the flow control group identifier may be a 3-bit number.

The flow control group identifier may be applied to the flow control state multiplexer 528 to select a corresponding bit from the scheduler flow control data. Continuing the previous example, the scheduler flow control data 548 may include eight bits indicating whether or not respective flow control groups should be scheduled. The flow control state multiplexer 528 may select the appropriate bit in accordance with the three-bit flow control group identifier. The flow control state multiplexer 528 may output a state bit 529 indicating the state (schedule/do not schedule) of the flow control group associated with the next stream.

The output logic 521 may send packet forming data 526, which may include the next stream identifier 525 and the flow control group identifier 527, to the pipeline packet generator 530 if the state bit 529 indicates such data can be accepted by the pipeline packet generator 530. When the state bit 529 indicates that the flow control group associated with the next stream should not be scheduled, the output logic 521 may not send the packet forming data to the pipeline packet generator 530. When the state bit 529 indicates that the flow control group associated with the next stream should not be scheduled, the output logic 521 may request the next stream selector 523 to select a different next stream.

Description of Processes

Figure 6:
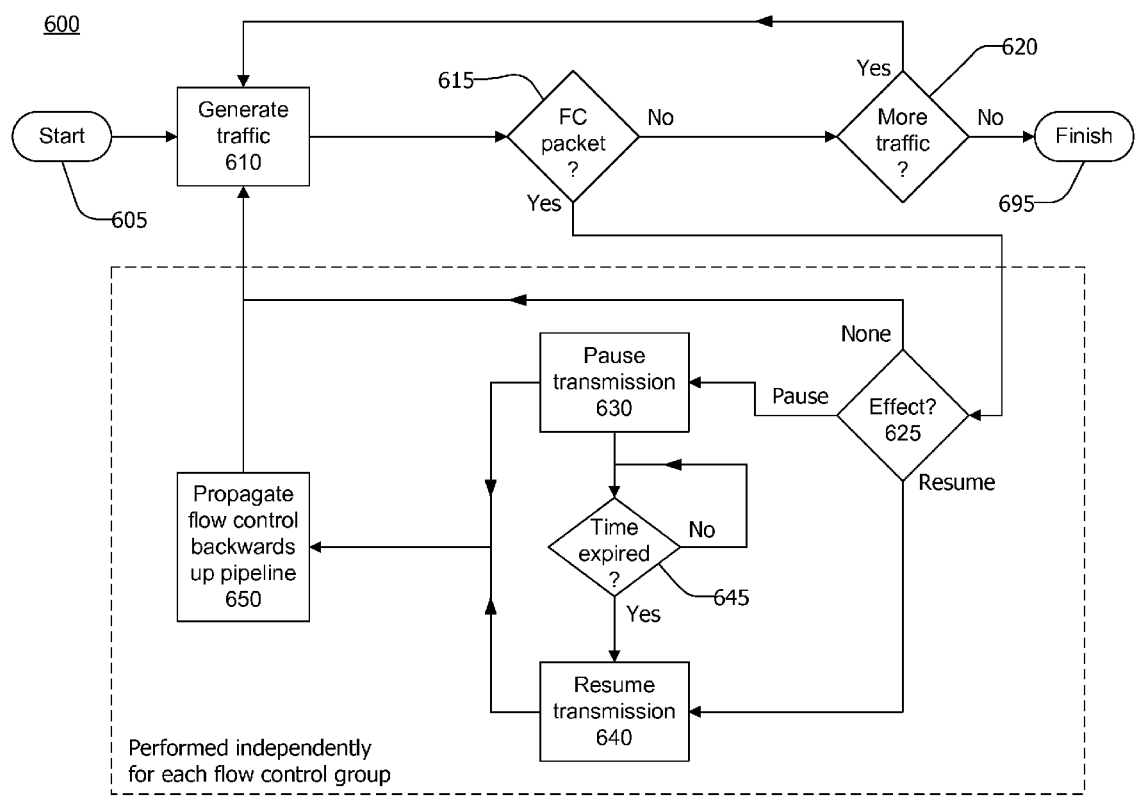
FIG. 6 is a flow chart of a process for generating traffic.

Referring now to FIG. 6, a process 600 for generating traffic may start at 605 and may end at 695 after a large number of packets have been generated, or when stopped by an operator action (not shown in FIG. 6). The process 600 may be appropriate for generating traffic using a traffic generator, such as the traffic generator 320 or the traffic generator 420. The process 600 may be cyclic and real-time in nature. The flow chart of FIG. 6 shows the process 600 as performed by a single port unit. It should be understood that the process 600 may be performed simultaneously by a plurality of port units in parallel during a test session.

Prior to the start of the process 600 at 605, a test session may have been designed. The test session design may be done, for example, by a test administrator computing device, such as the test administrator 205, coupled to one or more port units, such as the port unit 210. Designing the test session may include determining or defining the architecture of the network or network equipment, defining streams to be generated by each port unit during the test session, creating corresponding stream forming data, and forwarding respective stream forming data to at least one port unit. Designing the test session may also include defining a plurality of flow control groups (FCGs) and associating each stream with one FCG. FCG map data defining the associations between streams and FCGs may be provided to each port unit. For example, the FCG map data may be written into an FCG map memory, such as the memory 424, within each port unit.

At 610, the traffic generator may generate traffic by forming and transmitting a packet. At 615, a determination may be made whether or not a flow control (FC) packet has been received. When a flow control packet has not been received, a determination may be made at 620 whether or not there are more packets to be generated. If there are no more packets to be generated, the test session may finish at 695. When there are more packets to be generated, the process may repeat from 610. Although the actions at 610, 615, and 620 are shown to be sequential for ease of explanation, these actions may be performed concurrently. The actions from 610 to 620 may be repeated essentially continuously for the duration of a test session.

When a determination is made at 615 that a flow control packet has been received, the actions from 625 to 650 may be performed independently and concurrently for each of a plurality of flow control groups. At 625, a determination may be made if the received flow control packet contains instructions that affect a specific flow control group. For example, the flow control packet may contain an N-bit mask, where N is the number of flow control groups, indicating whether or not each flow control group is affected by the packet. The flow control packet may contain additional data indicating if transmission of each affected flow control group should be paused or resumed. The flow control packet may also contain information indicating a pause duration for each flow control group to be paused.

For example, a priority flow control packet in accordance with IEEE 802.1(Qbb) contains an eight-bit mask, where a bit value of 0 indicates the packet does not affect the status of a respective flow control group and a bit value of 1 indicates that the packet instructs that the respective flow control group be paused. A priority flow control packet also contains a pause duration for each flow control group to be paused, where a pause duration of zero indicates that a previously paused flow control group should be resumed.

At 625, a determination may be made that a received flow control packet contains instructions to pause a specific flow control group, to resume transmission of the specific flow control group, or has no effect (none) on the specific flow control group. When the received flow control packet has no effect on the specific flow control group, the process 600 returns to 610.

When a determination is made at 625 that the received flow control packet contains instructions to pause a specific flow control group, the packet generator may suspend transmission of packets associated with the paused flow control group at 630. For example, at 630, flow control data indicating that the flow control group has been paused may be applied at the output end of a pipeline packet generator. At 650, the flow control data may propagate backwards (in the reverse direction of the flow of packet forming data) up the pipeline to cause the traffic generator to stop generating packets for the paused flow control group in an orderly manner, such that no packets are dropped within the traffic generator and such that the transmission of packets may be resumed without waiting for the pipeline to refill.

When the received flow control packet contains instructions to pause a flow control group for a specified time interval, a timer may be started to track the time remaining in the specified time interval. When a determination is made at 645 that the specified time interval has elapsed, the packet generator may automatically resume transmission of packets associated with the paused flow control group at 640. For example, at 640, flow control data indicating that the flow control group is not paused may be applied at the output end of a pipeline packet generator. The flow control data may then propagate backwards up the pipeline at 650.

When a determination is made at 625 that the received flow control packet contains instructions to resume transmission of a flow control group, the packet generator may resume transmission of packets associated with the paused flow control group at 640. For example, at 640, flow control data indicating that the flow control group is not paused may be applied at the output end of a pipeline packet generator. The flow control data may then propagate backwards up the pipeline at 650.

Figure 7:
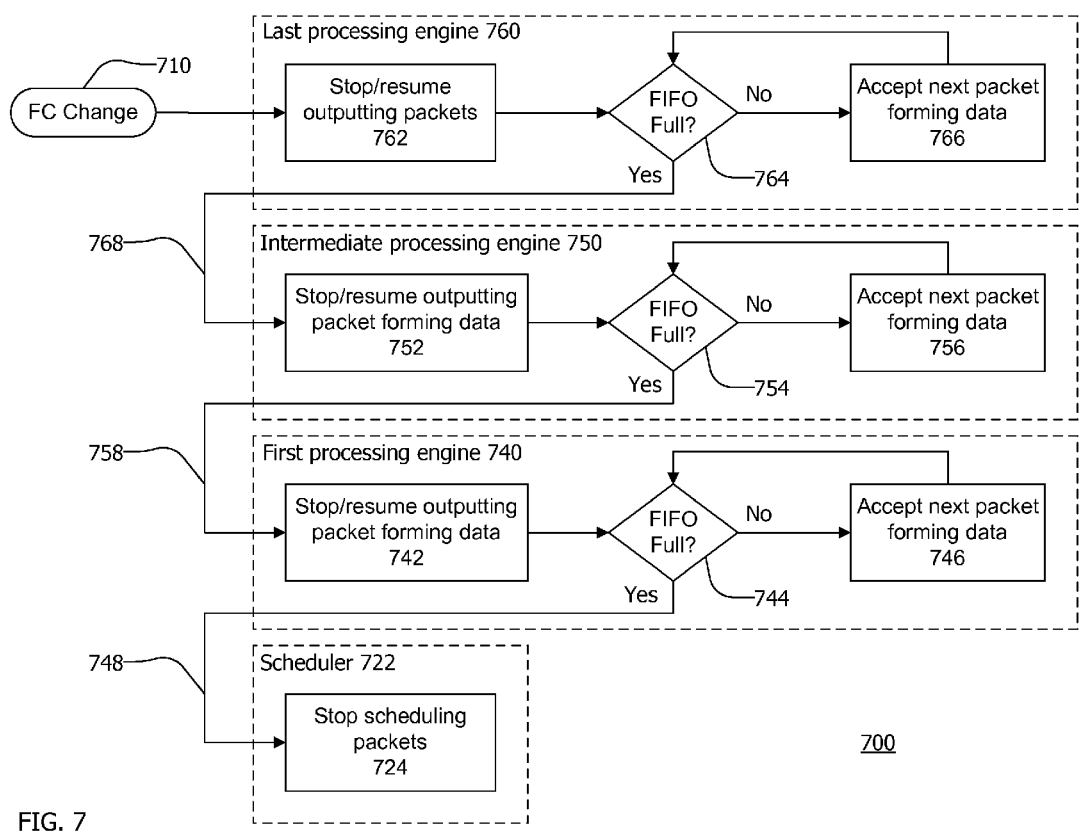
FIG. 7 is a flow chart of a process for flow control within a pipeline traffic generator.

Referring now to FIG. 7, an exemplary process 700 for flow control within a pipeline traffic generator may start at 710 when the flow control (FC) of a specific flow control group changes, which is to say when transmission of packets for the flow control group is paused or resumed. The process may not end at any specific point, but may be re-initiated and repeated each time the flow control of the flow control group changes. The flow chart of FIG. 7 shows the process 700 as performed by a single port unit for a single flow control group. It should be understood that the process 700 may be performed simultaneously by a plurality of port units in parallel during a test session, and that each port unit may perform the process 700 simultaneously for a plurality of flow control groups.

The exemplary process 700 may be performed by a pipeline traffic generator, which may be the traffic generator 420, including a scheduler 722 and a pipeline packet generator including a first processing engine 740, an intermediate processing engine 750, and a last processing engine 760. The first, intermediate, and last processing engines may include respective FIFO queues for each flow control group. The first, intermediate, and last processing engines may be, for example, the background engine 440, the fill engine 450, and the front end engine 460, respectively. The inclusion of three processing engines 740, 750, 760 is exemplary, and the process 700 may be adapted for traffic generators having more or fewer than three processing engines.

When process is initiated at 710 by a change in flow control for a specific flow control group, the last processing engine 760 may stop or resume outputting packets for the flow control group at 762. The last processing engine 760 may monitor the status of the FIFO queue that holds packet forming data for the flow control group at 764. When a determination is made at 764 that the FIFO queue is not considered full, the last processing engine 760 may accept and store packet forming data received from the intermediate processing engine 750 at 766. When a determination is made at 764 that the FIFO queue is considered full, the last processing engine 760 may send flow control data 768 to the intermediate processing engine 760. The flow control data 768 may be a "queue full" signal or data bit indicating that additional flow control data cannot be accepted.

When the intermediate processing engine 750 receives a "queue full" signal or data bit from the last processing engine 760, the intermediate processing engine 750 may stop outputting packet forming data to the last processing engine at 752. Conversely, when the intermediate processing engine 760 does not receive a "queue full" signal or data bit from the last processing engine 760, the intermediate processing engine 750 may continue or resume outputting packet forming data to the last processing engine at 752. The intermediate processing engine 750 may monitor the status of its FIFO queue that holds packet forming data for the flow control group at 754. When a determination is made at 754 that the FIFO queue is not considered full, the intermediate processing engine 750 may accept and store packet forming data received from the first processing engine 740 at 756. When a determination is made at 754 that the FIFO queue is considered full, the intermediate processing engine 750 may send a queue full signal or data 758 to the first processing engine 740.

The first processing engine 740 may operate similarly to the intermediate processing engine 750. The first processing engine 740 may stop or resume outputting packet forming data at 742 in response to the queue full signal or data bit from the intermediate processing engine. The first processing engine may accept and store, at 746, packet forming data received from the scheduler 722 so long as a determination is made at 744 that the respective queue is not considered full. When a determination is made at 744 that the respective queue is considered full, the first processing engine 740 may send a queue full signal or data bit 748 to cause the scheduler 722 to stop scheduling packets for the flow control group.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A port unit, comprising:
   a traffic receiver to receive flow control packets from a network under test; and
   a traffic generator pipeline to generate and transmit test traffic over the network under test, the test traffic including a plurality of interleaved packet streams, each packet stream associated with one of a plurality of flow control groups, the traffic generator pipeline comprising:
      a scheduler to determine a sequence in which packets belonging to the plurality of packet streams are generated, and
      two or more processing engines, including a first processing engine and a last processing engine, to perform sequential stages of a packet generation process, wherein
      the first processing engine inputs data indicative of the packet sequence from the scheduler and outputs flow control data to the scheduler,
      the last processing engine outputs competed packets ready for transmission, selectively pausing packet streams associated with one or more paused flow control groups in accordance with the received flow control packets,
      each processing engine except the last processing engine outputs packet forming data to a subsequent processing engine in the pipeline, and
      each processing engine except the first processing engine outputs flow control data to a previous processing engine in the pipeline.

2. The port unit of claim 1, wherein
   each of the two or more processing engines includes a respective bank of first-in-first-out (FIFO) queues, each bank including a plurality of FIFO queues associated respectively with the plurality of flow control groups, each FIFO queue to store packet forming data associated with the respective flow control group.

3. The port unit of claim 2, wherein
   the flow control data output by each processing engine indicates, for each flow control group, whether or not the FIFO queues within the processing engine can accept additional packet forming data.

4. The port unit of claim 3, wherein
   when the last processing engine pauses packet streams associated with one or more paused flow control groups, other processing engines in the traffic generator pipeline continue processing packets associated with each paused flow control group until flow control data received from an adjacent processing engine indicates the respective FIFO queue in the adjacent processing engine cannot accept additional packet forming data.

5. The port unit of claim 3, wherein
   the scheduler is configured to stop scheduling packet streams associated with each paused flow control group when the respective FIFO queue in the first processing engine cannot accept additional packet forming data.

6. The port unit of claim 2, wherein:
   the first processing engine is a background engine to retrieve a packet template for each packet in accordance with packet forming data received from the scheduler, the background engine including a first bank of FIFO queues;
   the last processing engine is a front end engine to insert checksums and insert a time stamp into the filled packet template to complete each packet, the front end engine including a third bank of FIFO queues; and
   the traffic generator pipeline further comprises a fill engine coupled between the background engine and the front end engine to insert content into variable content fields within the packet template to form a filled packet template, the fill engine including a second bank of FIFO queues.

7. The port unit of claim 6, the traffic generator pipeline further comprising:
   flow control logic to provide first flow control data to the front end engine based on received flow control packets.

8. The port unit of claim 7, wherein
   the front end engine provides second flow control data to the fill engine,
   the fill engine provides third flow control data to the background engine, and
   the background engine provides scheduler flow control data to the scheduler.

9. The port unit of claim 8, wherein
   when the second flow control data indicates a FIFO queue with in the front end engine cannot accept additional packet forming data, the fill engine stops processing packet streams associated with the corresponding flow control group,
   when the third flow control data indicates a FIFO queue within the fill engine cannot accept additional packet forming data, the background engine stops processing packet streams associated with the corresponding flow control group, and
   when the scheduler flow control data indicates a FIFO queue within the background engine cannot accept additional packet forming data, the scheduler stops scheduling packet streams associated with the corresponding flow control group.

10. A method for testing a network, comprising:
    receiving flow control packets from a network under test; and
    generating test traffic and transmitting the test traffic over the network under test, the test traffic including a plurality of interleaved packet streams, each packet stream associated with one of a plurality of flow control groups,
    wherein generating test traffic further comprises:
       generating packets using a traffic generator pipeline comprising a scheduler and two or more processing engines including a first processing engine and a last processing engine, the first processing engine inputting data indicative of the packet sequence from the scheduler and outputting flow control data to the scheduler, the last processing engine outputting competed packets ready for transmission, selectively pausing packet streams associated with one or more paused flow control groups in accordance with the received flow control packets, each processing engine except the last processing engine outputting packet forming data to a subsequent processing engine in the pipeline, and each processing engine except the first processing engine outputting flow control data to a previous processing engine in the pipeline.

11. The method of claim 10, wherein:

each of the two or more processing engines includes a bank of first-in-first-out (FIFO) queues, each bank including a plurality of FIFO queues associated respectively with the plurality of flow control groups, and the method further comprises storing packet forming data in the FIFO queues associated with the respective flow control group.

12. The method of claim 11, wherein the flow control data output by each processing engine indicates, for each flow control group, whether or not the FIFO queues within the processing engine can accept additional packet forming data.

13. The method of claim 12, generating test traffic further comprising:

when the last processing engine pauses packet streams associated with one or more paused flow control groups, each other processing engine in the traffic generator pipeline continuing to process packets associated with each paused flow control group until flow control data received from an adjacent processing unit indicates the respective FIFO queue is the adjacent processing engine cannot accept additional packet forming data.

14. The method of claim 12, the method further comprising:

the scheduler stopping scheduling packet streams associated with each paused flow control group when flow control data received by the scheduler from the first processing engine indicates the respective FIFO queue in the first processing engine cannot accept additional packet forming data.

15. The method of claim 11, wherein the first processing engine is a background engine, the last processing engine is a front end engine and the packet generator pipeline further comprises a fill engine coupled between the background engine and the front end engine, and generating test traffic further comprises:

the background engine retrieving a packet template for each packet in accordance with packet forming instructions received from the scheduler, the background engine including a first bank of FIFO queues;

the fill engine inserting content into variable content fields within the packet template to form a filled packet template, the fill engine including a second bank of FIFO queues; and the front end engine inserting checksums and inserting a time stamp into the filled packet template to complete each packet, the front end engine including a third bank of FIFO queues.

16. The method of claim 15, the method further comprising:

providing first flow control data to the front end engine based on received flow control packets.

17. The method of claim 16, generating packets further comprising:

the front end engine providing second flow control data to the fill engine;

the fill engine providing third flow control data to the background engine; and the background engine providing scheduler flow control data to the scheduler.

18. The method of claim 17, wherein when the second flow control data indicates a FIFO queue within the front end engine cannot accept additional packet forming data, the fill engine stopping processing packet streams associated with the corresponding flow control group, when the third flow control data indicates a FIFO queue within the fill engine cannot accept additional packet forming data, the background engine stopping processing packet streams associated with the corresponding flow control group, and when the scheduler flow control data indicates a FIFO queue within the background engine cannot accept additional packet forming data, the scheduler stopping scheduling packet streams associated with the corresponding flow control group.

19. A non-transitory computer-readable storage medium storing configuration data which, when used to program a programmable device, configures the programmable device to include a traffic generator pipeline to generate and transmit test traffic over a network under test, the test traffic including a plurality of interleaved packet streams, each packet stream associate with one of a plurality of flow control groups, the traffic generator pipeline comprising:

a scheduler to determine a sequence in which packets belonging to the plurality of packet stream are generated; and two or more processing engines, including a first processing engine and a last processing engine, to perform sequential stages of a packet generation process, wherein the first processing engine inputs data indicative of the packet sequence from the scheduler and outputs flow control data to the scheduler, the last processing engine outputs competed packets ready for transmission, selectively pausing packet streams associated with one or more paused flow control groups in accordance with the received flow control packets, each processing engine except the last processing engine outputs packet forming data to a subsequent processing engine in the pipeline, and each processing engine except the first processing engine outputs flow control data to a previous processing engine in the pipeline.

20. The non-transitory computer-readable storage medium of claim 19, wherein each processing engine in the traffic generator pipeline contains a bank of FIFO queues, each bank including a plurality of FIFO queues associated respectively with the plurality of flow control groups, each FIFO queue to store packet forming data associated with the respective flow control group, and the flow control data propagated by each processing engine indicates, for each flow control group, whether or not the FIFO queues within the processing engine can accept additional packet forming data.

21. The non-transitory computer-readable storage medium of claim 20, wherein
when the last processing engine pauses transmission of packet streams associated with one or more paused flow control groups, each other processing engine continues generating packets associated with each paused flow control group until the respective FIFO queue in a subsequent processing engine cannot accept additional packet forming data.

22. The non-transitory computer-readable storage medium of claim 20, wherein
the scheduler is configured to stop scheduling packet streams associated with each paused flow control groups when the respective FIFO queue in the first processing engine cannot accept additional packet forming data.

23. The non-transitory computer-readable storage medium of claim 19, wherein:
the first processing engine is a background engine to retrieve a packet template for each packet in accordance with packet forming data received from the scheduler, the background engine including a first bank of FIFO queues;
the last processing enema front end engine to insert checksums and insert a time stamp into the filled packet template to complete each packet, the front end engine including a third bank of FIFO queues; and
the packet generator pipeline further comprises a fill engine coupled between the background engine and the front end engine to insert content into variable content fields within the packet template to form a filled packet template, the fill engine including a second bank of FIFO queues.

24. The non-transitory computer-readable storage medium of claim 23, the traffic generator pipeline further comprising:
flow control logic to provide first flow control data to the front end engine based on received flow control packets.

25. The non-transitory computer-readable storage medium of claim 24, wherein
the front end engine provides second flow control data to the fill engine,
the fill engine provides third flow control data to the background engine, and
the background engine provides scheduler flow control data to the scheduler.

26. The non-transitory computer-readable storage medium of claim 25, wherein
when the second flow control data indicates a FIFO queue with in the front end engine cannot accept additional packet forming data, the fill engine stops processing packet streams associated with the corresponding flow control group,
when the third flow control data indicates a FIFO queue within the fill engine cannot accept additional packet forming data, the background engine stops processing packet streams associated with the corresponding flow control group, and
when the scheduler flow control data indicates a FIFO queue within the background engine cannot accept additional packet forming data, the scheduler stops scheduling packet streams associated with the corresponding flow control group.

* * * * *

UNITED STATES PATENT AND TRADEMARK OFFICE
CERTIFICATE OF CORRECTION

PATENT NO.         : 8,576,713 B2
APPLICATION NO.    : 12/766704
DATED              : November 5, 2013
INVENTOR(S)        : Sushil S. Kamerkar et al.

Page 1 of 1

It is certified that error appears in the above-identified patent and that said Letters Patent is hereby corrected as shown below:

In the Claims:

Column 21, line 25: replace "enema" with --engine is a--

Signed and Sealed this
Seventh Day of January, 2014

Margaret A. Focarino
*Commissioner for Patents of the United States Patent and Trademark Office*